Sept. 2, 1958 A. H. SCHOOLEY 2,850,727
PRECISION RANGE INDICATOR
Filed May 10, 1946
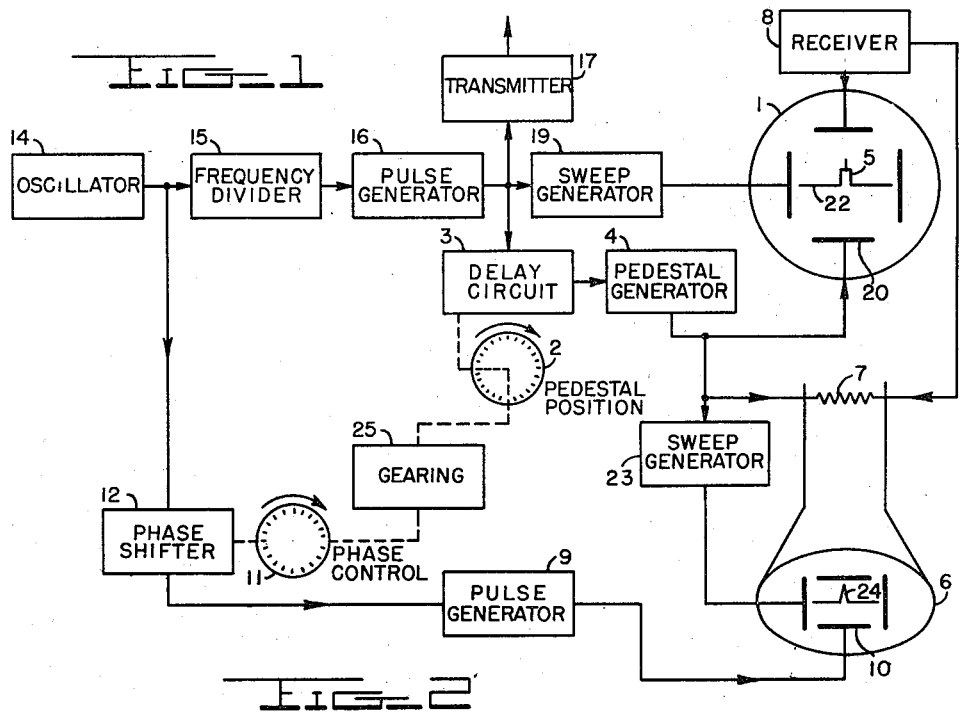
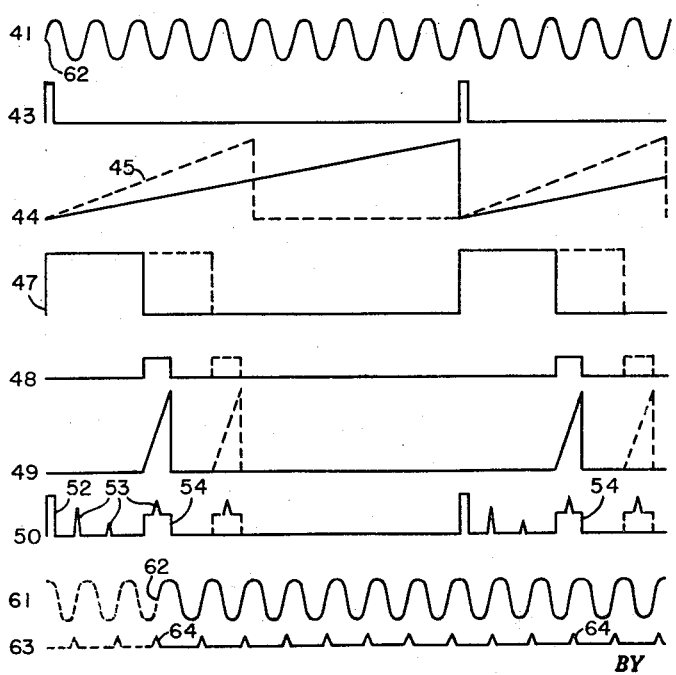
INVENTOR.
ALLEN H. SCHOOLEY
BY
*M. C. Hayes*
ATTORNEY United States Patent Office 2,850,727
Patented Sept. 2, 1958

2,850,727
PRECISION RANGE INDICATOR
Allen H. Schooley, Washington, D. C.
Application May 10, 1946, Serial No. 668,989
2 Claims. (Cl. 343—13)
(Granted under Title 35, U. S. Code (1952), sec. 266)

This invention relates to precision timing devices. It is particularly important in connection with the problem of precise determination of range.

Radio ranging devices ordinarily include means for producing and transmitting a series of energy pulses and a means for producing a timing scale on a cathode ray tube screen in synchronism with the transmitted pulses. A receiving means responsive to echoes from remote objects impinged upon by the transmitted pulses operates to produce an indication on the timing scale of the ranges of these objects. Such an indication is not accurate enough for precision ranging in certain applications such as the laying of guns on a target. For example, if a ten inch screen is used to represent a 100,000 yd. range, one tenth inch represents 1000 yds. The present invention provides a means for selecting a given target on the cathode ray tube screen and expanding the range scale in the neighborhood of that target on a separate cathode ray tube indicator.

It is therefore an object of the invention to provide an improved precision timing device.

It is another object of the invention to provide a means of precise echo ranging.

It is another object of the invention to select targets in a given range interval as shown on a cathode ray tube indicator and indicate these targets on a separate indicator.

It is another object of the invention to key a cathode ray tube indicator in variable time relation to a reference voltage wave.

It is another object of the invention to produce a precision sweep on a cathode ray indicator during a selected time interval in another cathode ray tube sweep.

It is another object of the invention to obtain the precise range of a target by generating a pedestal or aperture pulse whose time of occurence can be varied to select a given target indication on a main cathode ray tube indicator, indicating the target on a separate cathode ray tube having a time base generated during the aperture pulse, and moving the target indication into coincidence with a marker pip.

The invention will be better understood with reference to the drawings in which:

Figure 1 shows in block diagram an exemplary embodiment of the invention.

Figure 2 shows approximate waveforms which might appear as outputs of the various units in Figure 1.

On oscilloscope 1 are portrayed echoes from objects in a given direction within the complete range of the equipment (0 to 100,000 yds. for example.) By means of pedestal position control 2, delay circuit 3, and pedestal generator 4, a selected range interval (2000 yds. in this particular embodiment) is chosen as shown by pedestal 5 on the sweep trace of oscilloscope 1.

Signals in this chosen range are shown on oscilloscope 6 which has a much faster sweep applied to it than to oscilloscope 1. The positive square wave from pedestal generator 4 is used to cause the sweep for scope 6 to be generated during the chosen range interval.

The square wave from generator 4 also intensifies the grid 7 of oscilloscope 6 so that signals from receiver 8 will appear as bright spots on the screen during this interval.

Pulse generator 9 generates a marker pulse to be applied to plate 10 of oscilloscope 6. By means of phase control 11 and phase shifter 12 this pulse can be moved to coincidence with a given target indication to determine the range.

The oscillator 14 produces a reference timing wave for the system. Its frequency will depend on such factors as the maximum range of the equipment and the extent of the selected range interval shown on the precision range scope. For purposes of illustration, its frequency will be assumed to be 82 kc. Its output is fed to frequency divider 15 and to phase shifter 12. The frequency divider in this particular embodiment has a count down ratio of 50:1, producing a wave whose frequency is 1640 cycles. The frequency divider might be a series of multivibrators or other known count down circuits. Pulse generator 16 comprises circuits for producing a short duration trigger signal for each cycle of the frequency divider output. This pulse from generator 16 is employed by transmitter 17 for initiating a transmitter pulse to be radiated. Hence pulses will be radiated at the rate of 1640 a second. The trigger from 16 is also used to synchronize the output waveform of sweep generator 19 with the transmitted pulse in order that the sweep will start across the screen of oscilloscope 1 at approximately the same time that each pulse is radiated. The delay circuit 3 is likewise keyed from generator 16. Circuit 3 generates a pulse of variable length whose duration is determined by pedestal control 2. Pedestal generator 4 is keyed at the trailing edge of this variable pulse and produces a pulse of standard length. A pulse of say 12.4 microseconds duration is thus generated whose time of occurrence depends on the setting of pedestal control 2. It is applied to plate 20, oscilloscope 1 to form the pedestal 5 on the time base 22. By moving control 2, any desired echo indication can be set on the pedestal.

The pedestal waveform is also applied to sweep generator 23, which produces the fast linear (substantially straight line) time base for oscilloscope 6. At the same time, the pedestal waveform is applied as a gate to grid 7 of oscilloscope 6 to intensify the cathode ray tube beam.

Signals from receiver 8 are applied to grid 7 of oscilloscope 6. Only the signals that appear on pedestal 5 of oscilloscope 1 will be shown on the screen of tube 6. Since the signals are applied to the grid in this particular embodiment, they will appear as bright spots along the time base. Of course the signals could be indicated as "pips" on the time base by applying the receiver voltages to one of the two vertical deflection plates.

In order to range on a desired target shown on tube 6 a marker voltage is produced by circuit 9 and applied to plate 10 of the tube. The position of the marker 24 is controlled by phase control 11, which in this embodiment is coupled by a 50:1 gear ration to control 2 through gearing 25. The phase control 11 controls the phase of the 82 kc. wave generated by oscillator 14 as the wave passes through phase shifter 12.

One revolution of the pedestal control causes 50 revolutions of the phase shifter 12 or one revolution of control 11 cause one fiftieth of a turn of control 2. In ohter words, the phase of the 82 kc. wave is shifted a complete cycle for a fiftieth of a turn of control 2. The range marker produced from the 82 kc. wave by this circuit is thus shifted a cycle by a fiftieth of a turn of control 2 or by a full turn of control 11. Each revolution of phase control 11 represents a 2000 yd. range.

To range on a target, the pedestal control 2 is turned until the target indication is on the pedestal on the screen of tube 1. The signal will then appear on the screen of tube 6. The phase control is then moved till the echo indication coincides with the marker 24. The pedestal control may carry a dial to give approximate range and the phase control a dial to give precision range.

Since control 11 is geared to control 2 the marker 24 will remain fixed as the controls are turned and echoes will appear to move across the screen of oscilloscope 6. Suppose it is desired to range on a 10,500 yd. target. The pedestal control will be turned until the pedestal is under the target on the oscilloscope 1. The phase control 11, geared to the pedestal control will be rotated approximately five times since each rotation represents 2,000 yds. This shifts the 82 kc. wave five cycles relative to the transmitter pulse. The target indication will now appear on the precision range oscilloscope 6. When the phase control 11 is turned a quarter turn more than five revolutions the target indicator will be in coincidence with the marker.

The target was 10,500 yds. away which meant the echo would return in five and a quarter times 12.4 microseconds. The phase of the 82 kc. wave (each cycle of duration 12.4 micro-seconds) was shifted five and a quarter cycles. Since the time of occurrence of the marker pip depends on the phase shift of the 82 kc. wave, the echo indication on oscilloscope 6 is in coincidence with the marker.

The invention will be further clarified by reference to the approximate waveforms in Figure 2, which appear at various points in Fig. 1. For convenience in graphic portrayal the divider 15 is assumed to have a count down ratio of 10:1. Control 2 would then be coupled to control 11 with a gear ratio of 10:1.

Waveform 41 represents the output of the 82 kc. oscillator, which is the reference wave for all the keying operations of the circuit. This voltage is fed both to frequency divider 15 and phase shifter 12.

The frequency divider counts down 10:1 and one pulse is generated by circuit 16 for each 10 cycles of waveform 41 as shown in waveform 43. These pulses key the transmitter, the sweep generator for oscilloscope 1, and the delay circuit 3. The sweep generator waveform is shown by the solid line 44 or alternatively the dotted line 45. The delay circuit 3 (keyed by waveform 43) produces a pulse 47 of variable length depending on the setting of control 2. The pedestal generator is made operative on the trailing edge of wave 47 and puts out a standard pulse as shown in 48. This waveform is applied to oscilloscope 1 as a pedestal voltage, acts as intensifying gate for indicator 6, and gates the sweep for indicator 6. The sweep waveform 49 for indicator 6 shows that the sweep voltage rises for the duration of the gate 48. The voltages applied to the vertical plates of oscilloscope 1 are shown at 50. The transmitter pulse is 52, echo voltages are designated as 53, and the pedestal voltage as 54. The dotted lines in 47, 48, 49, and 50 show the waveforms resulting due to different setting of control 2.

The waveform 61 shows the master oscillator output 41 retarded 2.75 cycles by the phase shifter in order to range on the target on the pedestal 54 of waveform 50. Note that point 62 has shifted to the right. The marker pulses are shown at 63. For the case of the solid lines in 47, 48, 49, 50, only markers 64 appear on scope 6 since the scope is gated only on these cycles.

Since marker 64 now occurs at the time the echo on pedestal 54 is received, the marker and the echo indication will be in alignment on indicator 6.

The advantage of the invention over prior art should now be evident. Since a short range interval in the vicinity of the target indication is expanded on a separate screen, the echo indication can be lined up more accurately with the range marker. If a four inch precision scope is used each inch represents one fourth of 2000 yds. or 500 yds., and one tenth inch represents 50 yds. Whereas, one tenth inch on a main 10 in. scope represents 1000 yds. A dial coupled with the pedestal control will indicate approximate range and a dial coupled with the phase control will indicate precise range. By proper choice of circuit parameters, other range scales can be selected.

It is to be understood that the embodiment of the invention herein described is exemplary only and that certain modifications can be made without departing from the scope thereof as set forth in the appended claims.

The invention described herein may be manufactured and used by or for the Government of the United States of America for governmental purposes without the payment of any royalties thereon or therefor.

What is claimed is:

1. In combination, means to transmit periodic pulses and to receive an echo of each pulse prior to transmission of the next pulse, means to produce a high frequency wave having a period short relative to the time between said pulses, means to synchronize said transmitted pulses by said high frequency wave, a pulse indicator, a pulse generator, a phase shifter, means to supply said high frequency wave through said phase shifter to said pulse generator, said phase shifter being adapted to produce a phase shift in oscillations supplied to said pulse generator variable through three hundred and sixty degrees and said pulse generator being adapted to produce a pulse at a fixed time in the period of the wave supplied by said phase shifter, means to render said pulse indicator operative over a period short relative to the time between successive transmitted pulses to indicate both received echoes and pulses produced by said generator, and means to vary in unison said phase shifter and the time interval between transmission of said pulses and the time of operation of said indicator.

2. In combination, means to transmit a series of periodic pulses and to receive echoes thereof over a predetermined interval after each transmitted pulse, means to produce a second and a third series of periodic pulses, the pulses of the third series being shorter than and occurring within the interval of the pulses of the second series and the pulses of the second series being short relative to said interval over which echoes are received and substantially longer in duration than the duration of each transmitted pulse, a cathode ray oscillograph connected and arranged to indicate received echoes on a viewing screen, means to operate said oscillograph to indicate only the echoes received during the pulses of said second series, means to vary the phase relation between the pulses of the first and second series, and means responsive to said third series of pulses to produce an indication on said screen at a position substantially fixed irrespective of variations of said phase relation.

References Cited in the file of this patent

UNITED STATES PATENTS

| | | |
|---|---|---|
| 2,355,363 | Christaldi | Aug. 8, 1944 |
| 2,405,591 | Mason | Aug. 13, 1946 |
| 2,416,088 | Deerhake | Feb. 18, 1947 |
| 2,416,089 | Jones | Feb. 18, 1947 |

FOREIGN PATENTS

| | | |
|---|---|---|
| 552,072 | Great Britain | Mar. 22, 1943 |